United States Patent [19]
You et al.

[11] Patent Number: 5,946,046
[45] Date of Patent: *Aug. 31, 1999

[54] CAPTION PROCESSING DEVICE AND METHOD FOR A DISPLAY UNIT WITH A SEPARATE DISPLAY

[75] Inventors: Yong Zae You, Nam-ku; Chang Il Lee, Suwon-si, both of Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/960,073

[22] Filed: Oct. 24, 1997

Related U.S. Application Data

[63] Continuation of application No. 08/839,627, Apr. 15, 1997, abandoned, which is a continuation of application No. 08/501,770, Jul. 13, 1995, abandoned.

[30] Foreign Application Priority Data

Jul. 15, 1994 [KR] Rep. of Korea ............... 94-17106

[51] Int. Cl.⁶ ............... H04N 5/445; H04N 11/20
[52] U.S. Cl. ............... 348/468; 348/563
[58] Field of Search ............... 348/563, 564, 348/569, 570, 468, 473, 476, 478, 906; H04N 5/445, 11/20, 7/00

[56] References Cited

U.S. PATENT DOCUMENTS

| | | | |
|---|---|---|---|
| 4,449,198 | 5/1984 | Kroon et al. | 358/342 |
| 4,477,841 | 10/1984 | Chen et al. | |
| 5,299,006 | 3/1994 | Kim | |
| 5,307,055 | 4/1994 | Baskin et al. | 348/734 |
| 5,315,386 | 5/1994 | Muramoto | |
| 5,485,518 | 1/1996 | Hunter et al. | 348/5.5 |

*Primary Examiner*—Michael H. Lee
*Attorney, Agent, or Firm*—John P. White; Cooper & Dunham LLP

[57] ABSTRACT

Caption processing device and method for a display unit with a separate display is presented, where the caption is displayed separately from a monitor which displays the video signal, so that partial covering of the video signal by the caption is avoided. The caption processing device for a display unit which extracts caption data from a video signal and displays the caption, the device includes the separate display for displaying the caption separate from the video signal, a control part for generating a control signal which can control display of the caption data, and a display driving part for receiving the caption data, processing the caption data according to the control signal from the control part and applying the processed data to the display.

9 Claims, 9 Drawing Sheets

CAPTION PROCESSING DEVICE AND METHOD FOR A DISPLAY UNIT WITH A SEPARATE DISPLAY

This application is a continuation of U.S. Ser. No. 08/839,627, filed Apr. 15, 1997, abandoned now, which was a continuation of U.S. Ser. No. 08/501,770, filed Jul. 13, 1995, now abandoned.

BACKGROUND OF THE INVENTION

The present invention relates to a display unit such as a caption VCR, and more particularly to a caption processing device and method for a display unit with a separate display from a monitor for displaying a video signal on the monitor without being partially covered by a caption signal or OSD (On Screen Display).

In a conventional OSD (On Screen Display) or a video display device for displaying a caption signal together with a video signal, the caption signal is displayed together with the video signal on a TV monitor screen.

Therefore, when the caption signal is displayed with the video signal on the TV screen, the caption signal is displayed in a part of the screen where the video signal is displayed, so that the part of the video signal on the screen where the caption signal is displayed is covered by the caption signal, and thus, the video signal in that part is not displayed on the screen.

As shown in FIG. 1, a conventional VCR includes a data slicer 1, a data processor 2, and a mixer 3.

The data slicer 1 receives a composite video signal (CVS) and outputs caption data, and includes a synchronizing signal separator 11 for separating horizontal synchronizing signals Hsync and vertical synchronizing signals Vsync from a composite video signal input, a data slicer 12 for detecting and outputting a caption signal from the composite video signal, and a control logic 13 for accepting synchronizing signals Hsync, Vsync from the synchronizing signal separator 11, detecting a caption line which is the 21st line in the odd-numbered fields, and outputting a sample/hold signal S/H for detecting a caption signal to the data slicer 12, and accepting a caption signal CS from the data slicer 12 and outputting caption data CD.

Here, the control logic 13 accepts a horizontal synchronizing signal Hsync and counts the position on a horizontal line and the horizontal lines in each field, uses this data to detect a caption line, detects this to output a sample/hold signal S/H to the data slicer 12, accepts the detected caption signal from the data slicer 12 and outputs caption data.

The data processor 2 processes the caption data outputted by the control logic 13 of the data slicer 1, and includes a central processing unit (CPU) 21, OSD logic 22, video RAM 23, and character ROM 24.

Here, the central processing unit (CPU) 21 receives caption data CD from the control logic 13 and outputs a suitable control signal CTL, and the OSD logic 22 receives the control signal CTL from the CPU 21 and the sample and line count from the data slicer 1 to control the position of the caption displayed.

The mixer 3 mixes the composite video signal CVS reproduces from a video tape and the caption data from the OSD logic 22 and outputs the result to the TV.

Therefore, when the TV is applied of the composite video signal reproduced from a video tape, or of a broadcasting signal received through a VCR tuner, as shown in FIG. 2, the video signal is displayed, together with a caption on a part of the screen where the video signal is displayed.

When the caption VCR with the system described above has its own caption display being selected, the caption VCR composites the caption signal processed into a caption with the main image and displays them on the monitor, on the same time.

Or, when the caption VCR has a caption selection key of TV function keys pressed, caption data CD is extracted by the data slicer 1 from the composite video signal CVS reproduced from the video tape, and the extracted caption data CD is processed into a caption by the data processor 2.

Caption data processed by the data processor 2 is applied to the mixer 3 and mixed with the composite video signal CVS, and the output of the mixer 3 is outputted to the monitor or TV 4.

If the caption selection key is pressed again, the caption disappears from the screen, with only the video signal is displayed.

In FIG. 2, reference number 200 is a VCR, 210 a TV, 220 a caption displayed with a video signal on the same screen, 230 a Braun display (screen), and 240 a cable.

Thus, as shown in FIG. 2, in a conventional caption VCR, part of the video signal displayed on the screen is covered by the caption when the caption is displayed.

SUMMARY OF THE INVENTION

To overcome disadvantages of the prior art as described above, it is an object of the present invention to provide a caption processing device for a display unit, wherein a caption display separate from a monitor which displays the video signal is included, so that the screen displaying the video signal is not covered by caption processing.

It is another object of the present invention to provide a caption processing method of a display unit, wherein the video signal is displayed by a monitor, and the caption is displayed by a display device separate from that displaying the video signal, so that the screen displaying the video signal is not covered by caption processing.

To accomplish the above-mentioned objects, a preferred embodiment of a caption processing device for a display unit with a separate display according to the present invention is provided, the display unit extracts caption data from a video signal and displays the caption, the device includes the separate display for displaying the caption separate from the video signal, a control part for generating a control signal which can control display of the caption data, and a display driving part for receiving the caption data, processing the caption data according to the control signal from the control part and applying the processed data to the display.

In addition, in order to accomplish the above-mentioned objects, a caption processing method for a display unit with a separate display according to the present invention is provided, including a signal separation step for separating caption data from a video signal, a processing step for processing the caption data into data to be used for display, and a display step for displaying the processed caption data on a display which does not make the caption data to overlap on the video signal.

These and other objects, features and advantages of this invention will become more apparent from the following detailed description of a preferred embodiment, when considered in connection with the accompanying figures.

BRIEF DESCRIPTION OF THE ATTACHED DRAWINGS

DETAILED DESCRIPTION OF THE INVENTION

A preferred embodiment of the present invention will be described below in detail.

Figure 3:
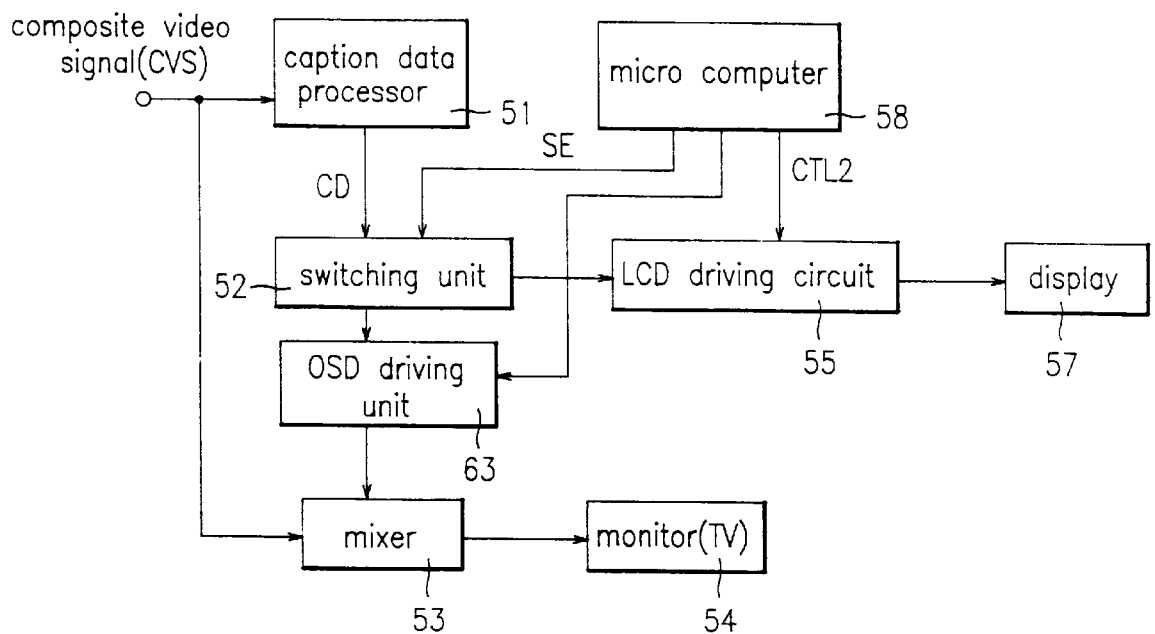
FIG. 3 is a block diagram of a caption processing device for a caption VCR with a separate caption display according to the present invention.

FIG. 3 is a block diagram of a caption processing device of a caption VCR with a caption display separate from a monitor displaying the video signal according to the present invention. According to a preferred embodiment, the caption VCR and the caption display is connected by means of a connection device.

According to FIG. 3, a caption VCR according to a preferred embodiment which reproduces the composite video signal recorded on a video tape, extracts caption data from the reproduced composite video signal through a caption data processor 51, and displays the composite video signal and the caption data, includes a switching unit 52, mixer 53, monitor 54, LCD driving circuit 55, LCD 57, a microcomputer 58, and an OSD driving unit 63.

A caption data processor 51 receives a composite video signal reproduce from a video tape, and extracts and outputs caption data from the reproduced composite video signal.

The switching unit 52 switches the caption image signal from the caption data processor 51 either to the OSD driving unit 63 to convert the caption data into a caption images signal and to apply it to the mixer 53, which caption image signal is displayed on the monitor 54 together with the video signal under the control of the microcomputer 58, when the microcomputer 58 outputs a selection signal for displaying the video signal and caption on the same screen, or to the LCD driving circuit 55, when the microcomputer 58 outputs a selection signal for displaying the caption on the LCD 57.

The mixer 53 mixes the composite video signal CVS and caption image signal CS, which mixed data is presented to the monitor 54 to display the caption and the video signal on the same screen when caption data CD is applied thereto through the switching unit 52 and the OSD driving unit 63, and presents only the composite video signal CVS to the monitor to display only the video signal on the screen when there is no caption data CD applied thereto through the switching unit 52 and the OSD driving part 63.

A LCD 57 is a separate display device for displaying a caption separately from the video signal displayed on a monitor 54.

A LCD driving circuit 55 processes caption data applied through the switching unit 52 according to a control signal CTL2 from a microcomputer 58 into data for driving the LCD 57, and outputs the processed data to the LCD 57, so that the caption is displayed.

A microcomputer 58 outputs a select signal SE to the switching unit 52 for applying caption data from the caption data processor 51 to the mixer 53 or the LCD driving circuit 55, and outputs a control signal CTL2 for processing caption data to the LCD driving circuit 55.

Caption processing operation of a caption VCR having the foregoing system is to be described, hereinafter.

First, in the case where both the video signal and the caption are displayed through the monitor, a select signal SE for applying caption data CD from the caption data processor 51 to the mixer 53 is sent from the microcomputer 58 to the switching unit 52.

In the caption data processor 51, caption data CD is extracted from the composite video signal CVS, and the extracted caption data applied from the switching unit 52 to the OSD driving unit 63 is, converted into a caption image signal, and applied to the mixer 53.

At the mixer 53, the received composite video signal CVS and the caption image signal are mixed, and the mixed image signal is presented to the monitor 54.

Figure 1:
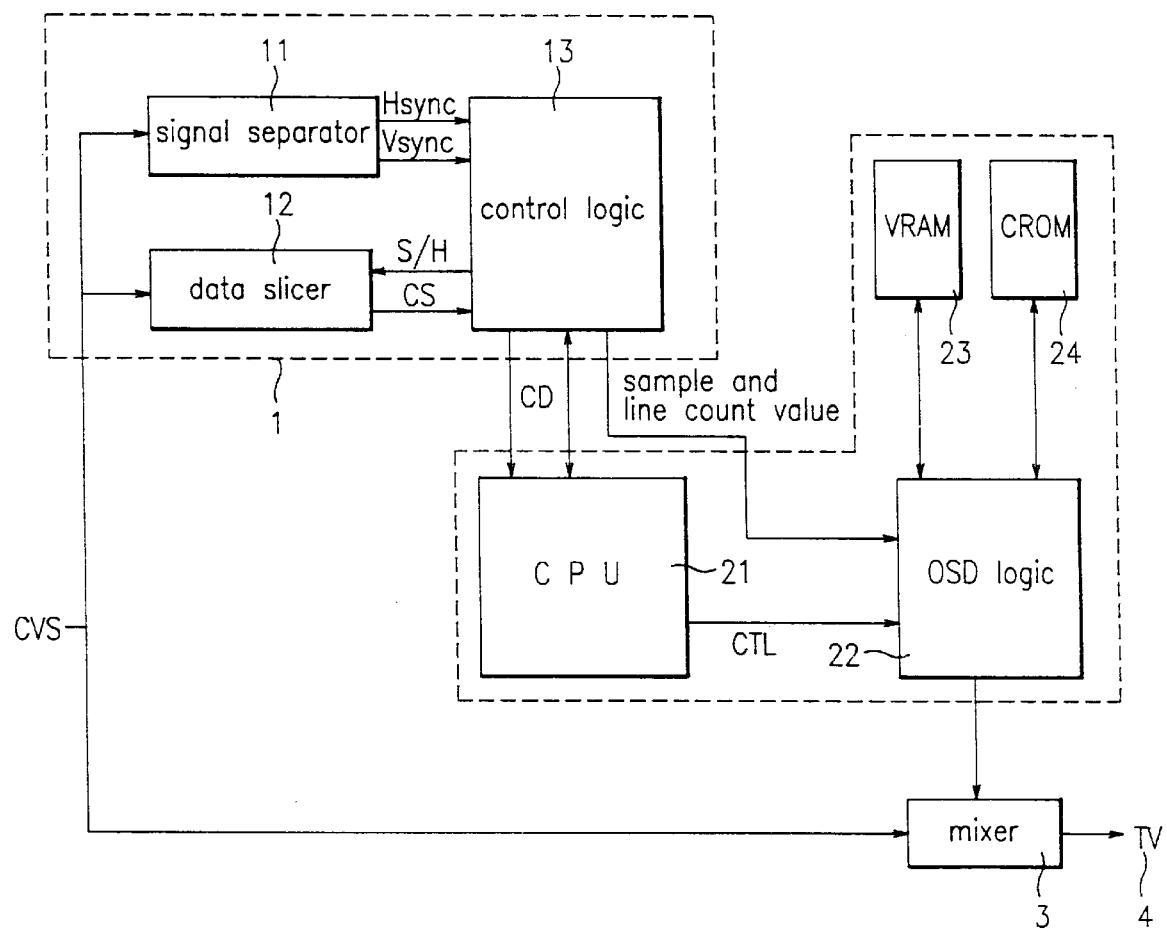
FIG. 1 is a block diagram of a caption module of a conventional caption VCR.
Figure 2:
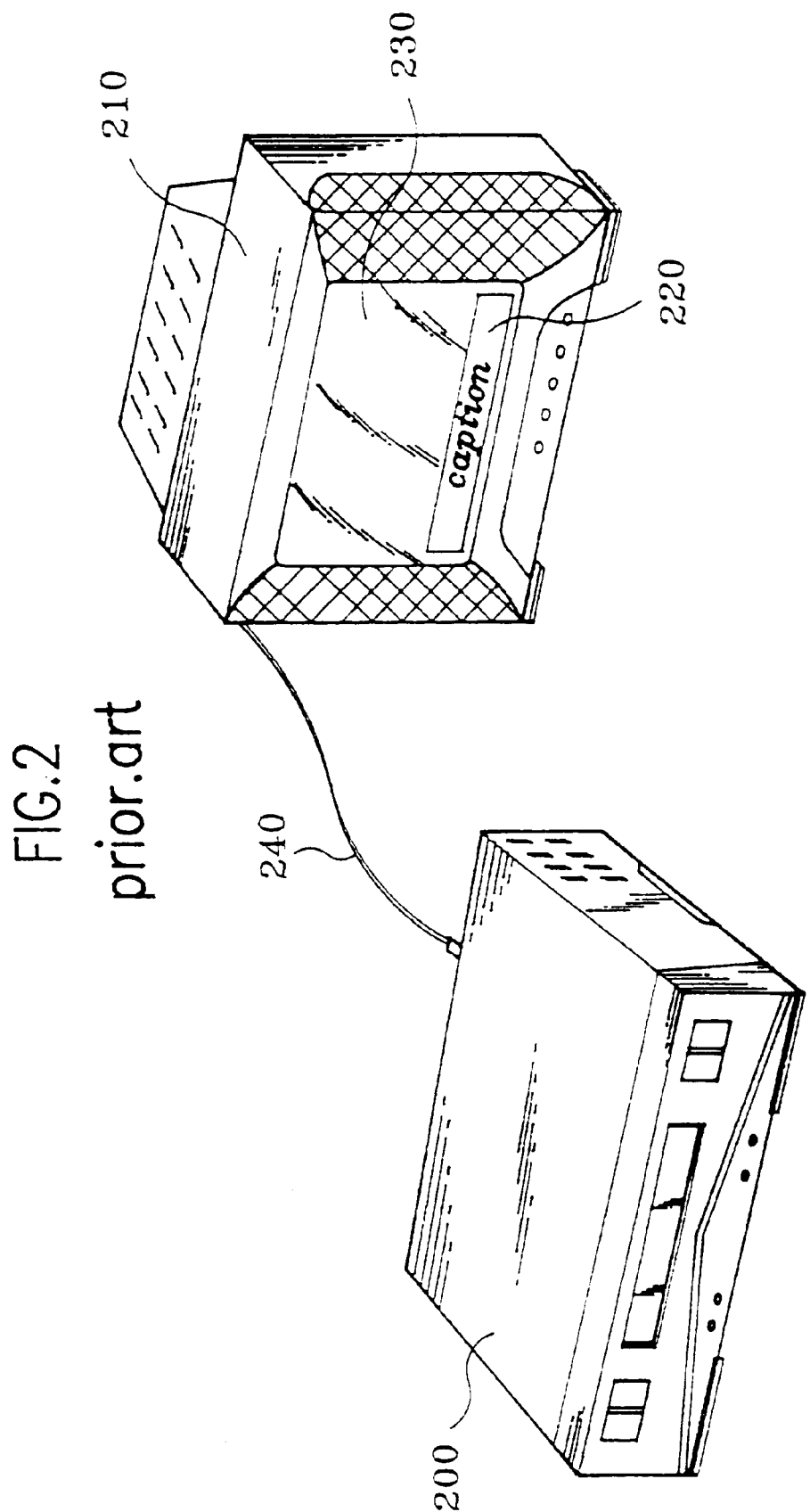
FIG. 2 is a connection diagram of a conventional caption VCR and TV displaying captions and video signals on the same screen.

Therefore, as shown in FIG. 2, the monitor 54 displays both the video signal and the caption on one screen on the same time.

Also, if the video signal is displayed through a monitor and the caption is displayed through a separate LCD display, a select signal SE for applying caption data CD from the caption data processor 51 to the LCD driving circuit 55 is sent from the microcomputer 58 to the switching unit 52.

The caption data CD from the caption data processor 51 is then inputted to the LCD driving circuit 55 through the switching unit 52.

Meanwhile, only the composite video signal CVS is applied to the monitor 54 through the mixer 53, so that only the video signal is displayed on the monitor 54 screen.

At the LCD driving circuit 55, caption data CD applied through the switching unit 52 is processed into data for driving the LCD according to the control signal CTL2 from the microcomputer 58, and is sent to the LCD 57.

The LCD 57 receives caption data from the LCD driving circuit 55 and displays the caption.

Accordingly, the video signal is displayed through the monitor 54 and the caption is displayed through the LCD separately from the video signal.

Figure 4:
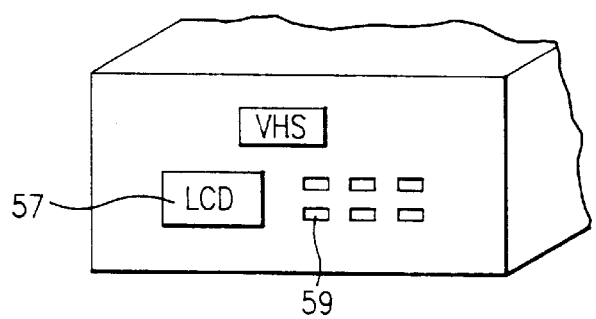
FIG. 4 is a partial diagram of a caption VCR with a caption LCD attached to the front panel according to an embodiment of the present invention.

FIG. 4 shows an embodiment of the present invention wherein a separate caption LCD display device is attached to the front panel of a caption VCR.

The video signal is displayed by the monitor 54, and the caption is displayed by the LCD 57 attached to the front panel of the caption VCR.

In FIG. 4, reference number 59 represents the function keys of a caption VCR.

Figure 5:
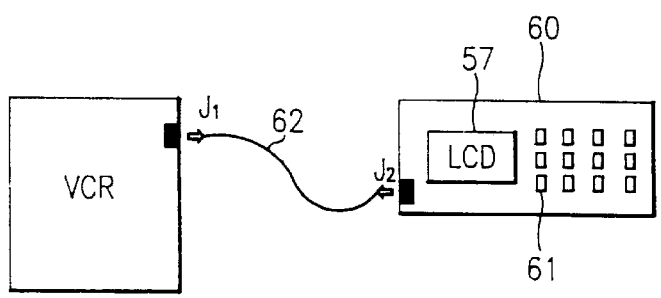
FIG. 5 is a diagram of a remote controller with attached caption display, which is connected to a caption VCR by a connector according to an embodiment of the present invention.

FIG. 5 shows an embodiment of the present invention wherein a separate caption LCD display device is attached to a remote controller.

A caption VCR and a remote controller 60 is linked by a connection device 62, so that as in the case where a separate LCD 57 is attached to the front panel of a caption VCR, the video signal is displayed through a monitor 54, and the caption is displayed through the LCD 57 attached to the remote controller 60.

Here, a connector or a cable is used as the connection device 62.

In FIG. 5, reference number 61 represents the function keys of a remote controller, and J1 and J2 represent jacks.

And, the caption data can be transmitted from the VCR to the remote controller, with wireless transmission and reception, to display it on an LCD of the remote controller.

Figure 6:
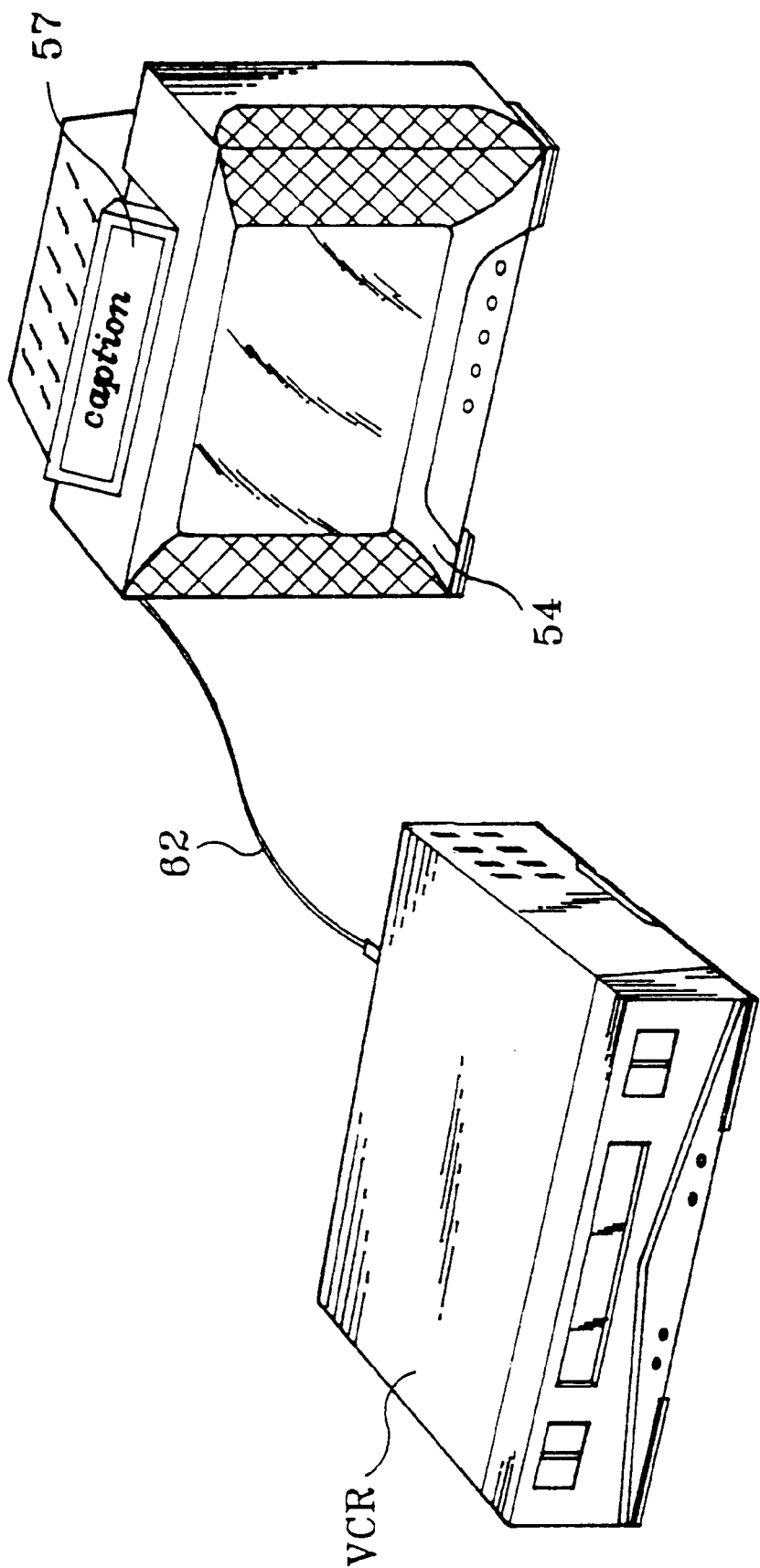
FIG. 6 is a diagram of a TV with an attached caption display according to an embodiment of the present invention.
Figure 7:
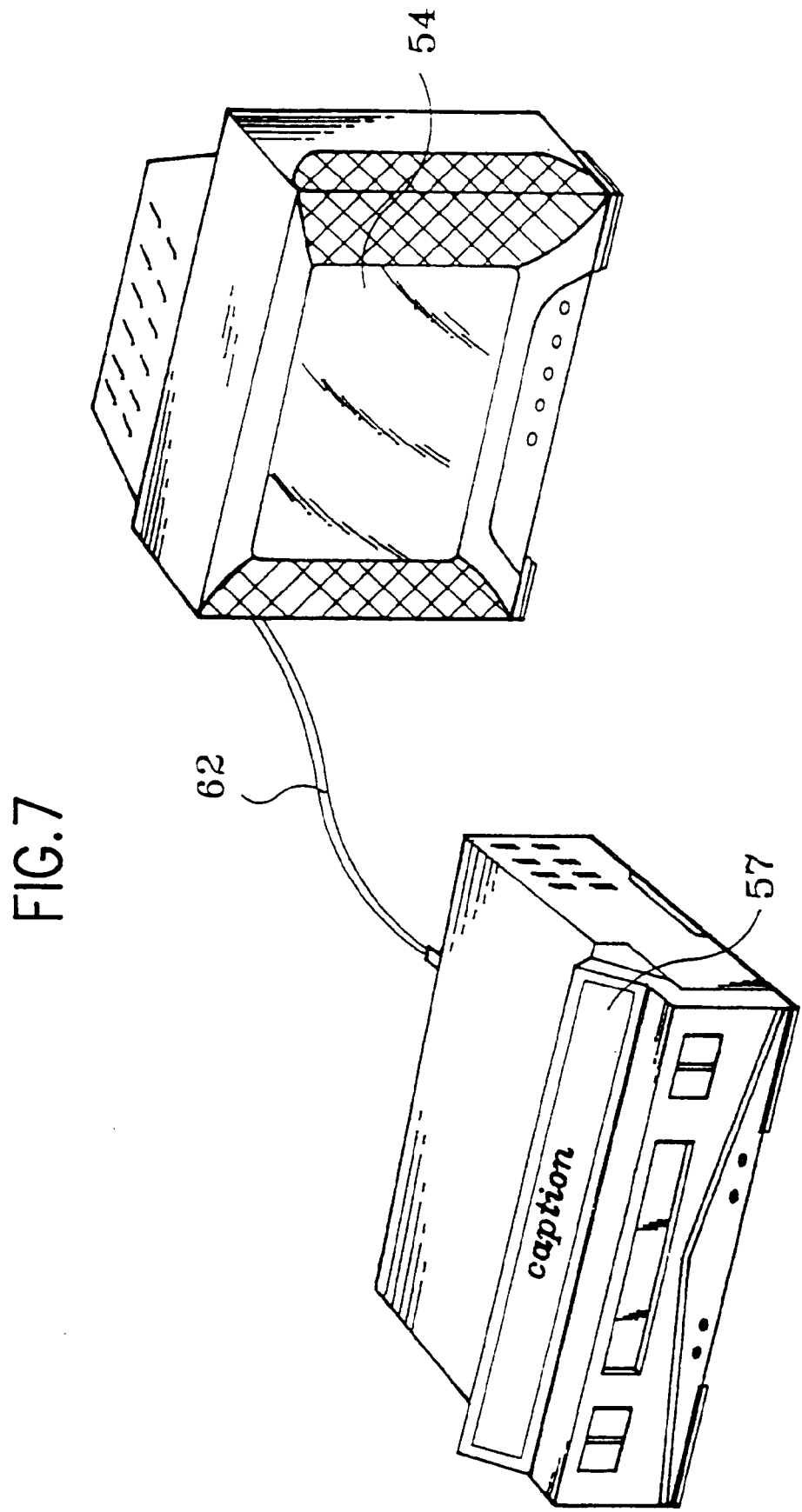
FIG. 7 is a diagram of a caption VCR with an attached caption display according to one embodiment of the present invention.

FIG. 6 and FIG. 7 show embodiments of the present invention wherein a caption LCD is attached to the upper portion of a TV monitor or of a caption VCR.

As shown in FIG. 6, a separate caption LCD 57 may be placed at a certain position, for example on the upper portion of a TV monitor, separate from the video display device.

Also, as shown in FIG. 7, a separate caption LCD 57 may be placed at a certain position, for example on the upper portion of a caption VCR.

In the cases described above, the video signal and the caption is displayed through the TV 54 and the LCD 57 respectively.

Figure 8:
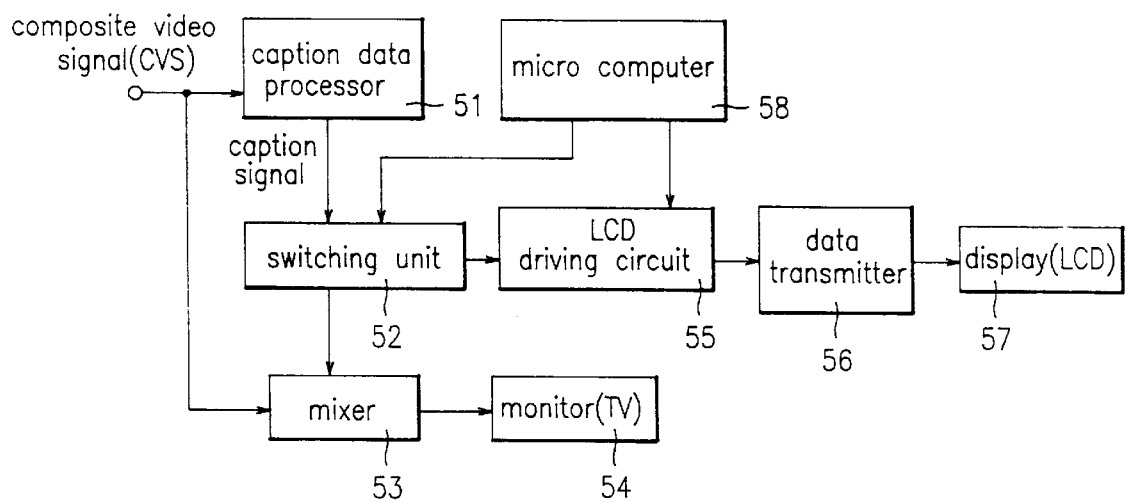
FIG. 8 is a block diagram of a caption processing device for a caption VCR with a separate caption display according to other embodiment of the present invention.
Figure 9:
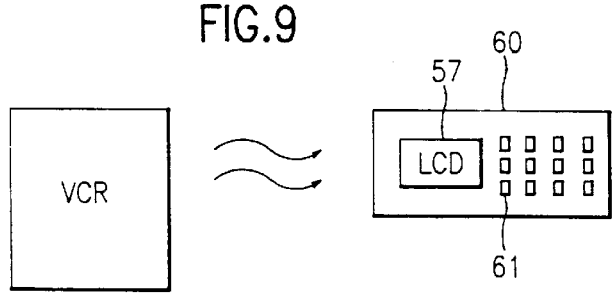
FIG. 9 is a diagram of a wireless remote controller with an attached caption display according to other embodiment of the present invention.

FIG. 8 is a block diagram of an embodiment of a caption processing device for a caption VCR with a caption display separate from a monitor displaying the video signal according to the present invention, and FIG. 9 shows an embodiment of the present invention wherein a caption LCD is attached to a wireless remote controller.

According to another embodiment of the present invention, with reference to FIG. 9, in contrast to an embodiment described above, a caption VCR and a caption display are not connected by a connection device, but caption data is sent and received by wireless means and displayed.

As shown in FIG. 8, another embodiment of a caption VCR according to the present invention comprises the components described above, and additionally comprises a data transmitter 56 for receiving processed LCD driving data from the LCD driving circuit 55, converting the inputted analog data into digital data, and transmitting the data by wireless means to a LCD 57.

Also, a remote controller 60 with an attached LCD 57, in contrast to an embodiment described above, additionally comprises a wireless receiver (not shown) for receiving digital data transmitted by wireless means from a data transmitter 56, and converting the received digital data to analog data for driving the LCD.

Figure 10:
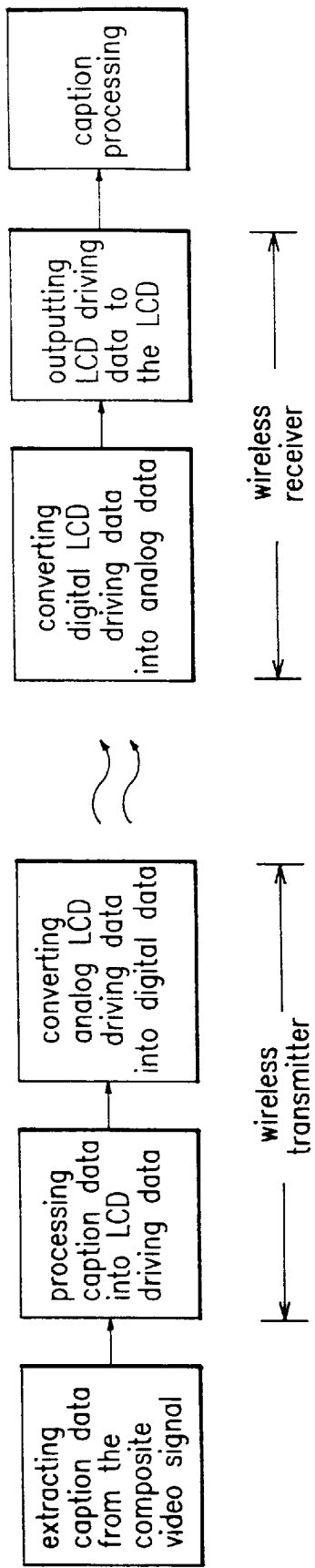
FIG. 10 is a diagram illustrating the transmission and reception of data in a caption processing device for a caption VCR as shown in FIG. 8.

In another embodiment of the present invention, data for driving the LCD 57 processed by the LCD driving circuit 55 is not outputted directly as in an embodiment described above, but as shown in FIG. 10, analog data for driving the LCD processed by the LCD driving circuit 55 to be suitable for wireless transmission and reception is received by a data transmitter 56, and the received analog data is converted to digital data and outputted for wireless transmission.

The wireless receiver of a wireless remote controller 60 then receives the digital data and converts it into analog data for driving the LCD, and the converted analog data is outputted to the LCD 57 and the caption is displayed by this LCD 57.

Figure 11:
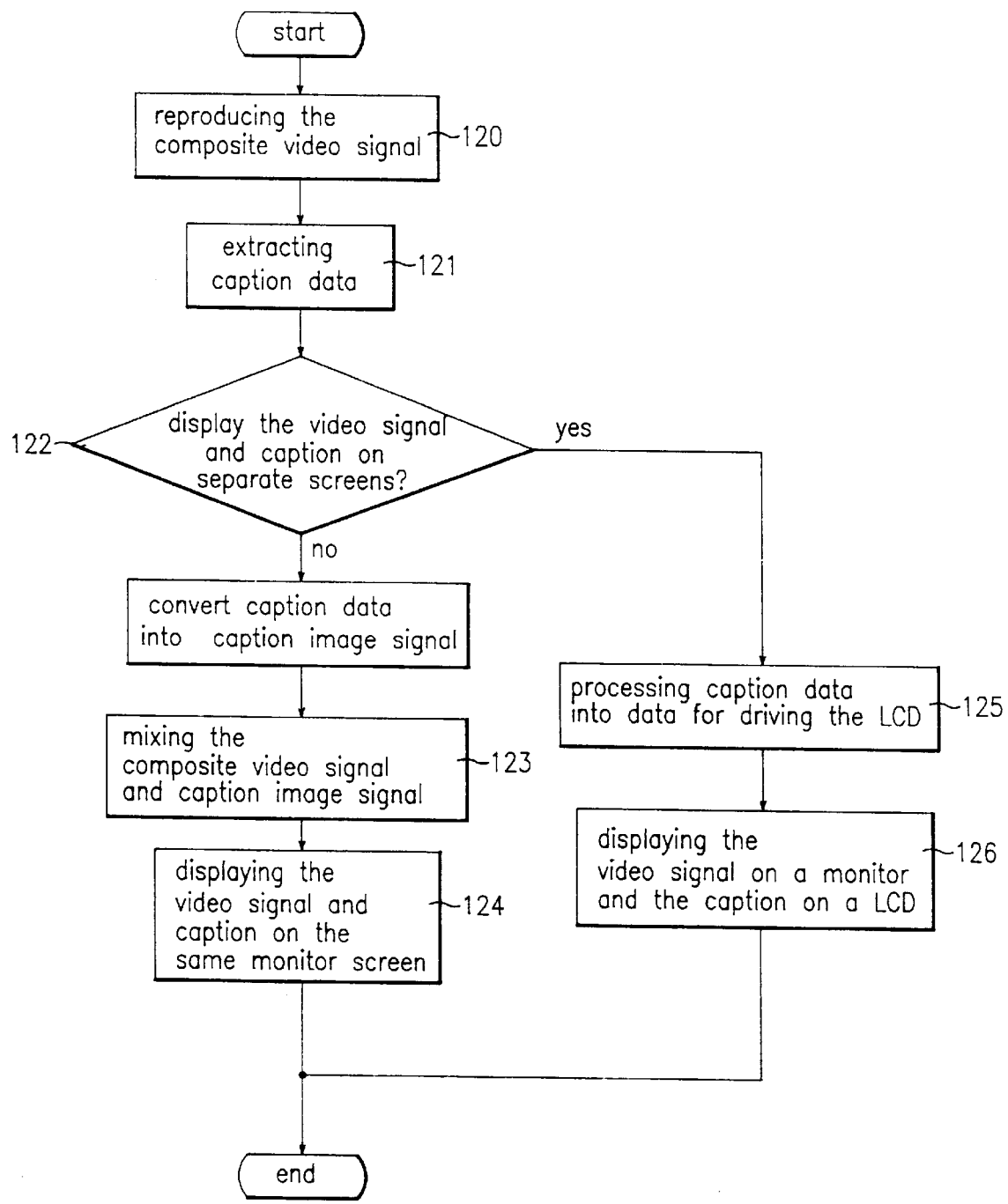
FIG. 11 is an operational flowchart of a caption VCR with a separate display according to the present invention.
Figure 12:
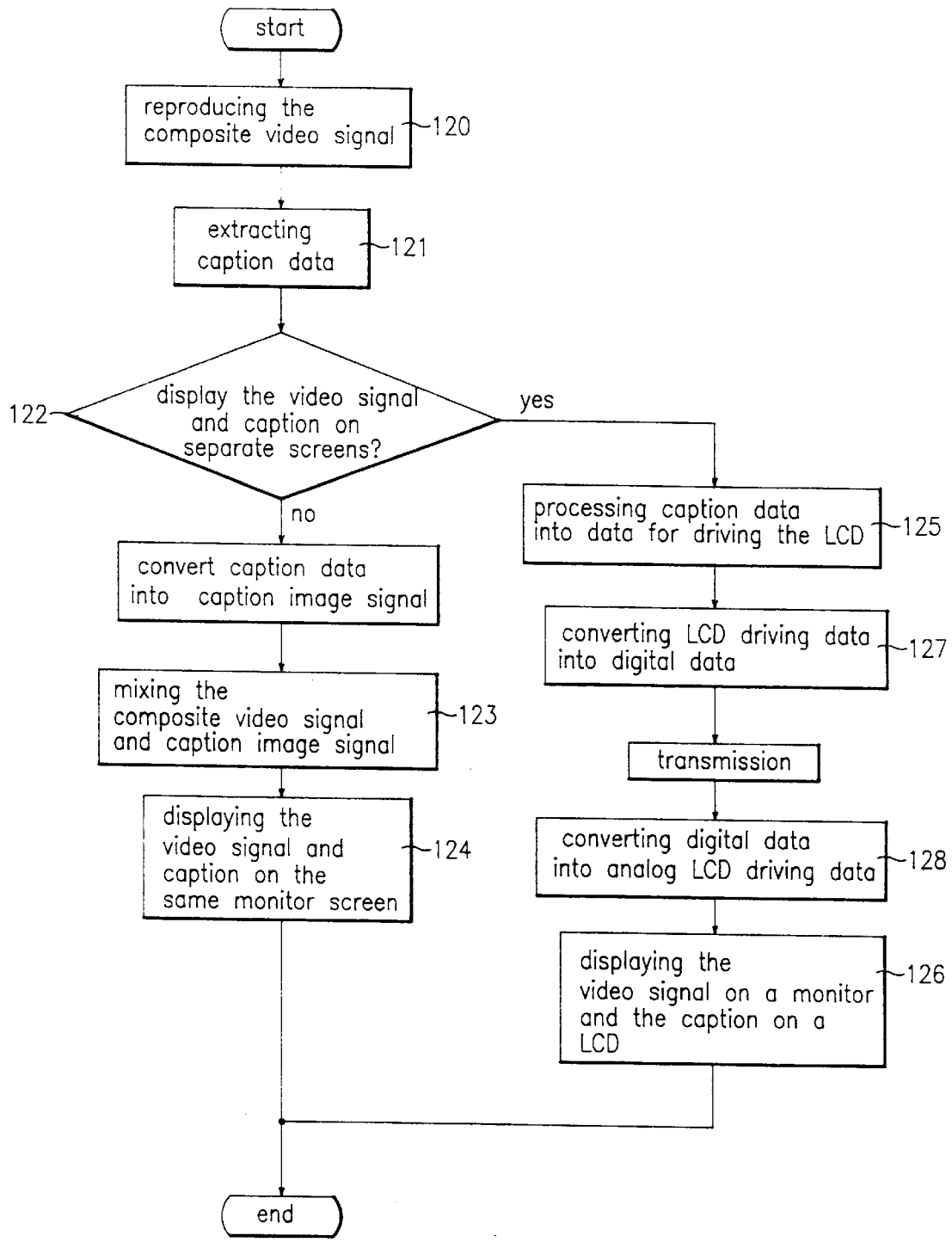
FIG. 12 is another operational flowchart of a caption VCR with a separate display according to the present invention.

FIG. 11 and FIG. 12 are operational flowcharts of a caption processing device for a caption VCR according to the present invention.

The operation of a caption processing method for a caption VCR as described above is illustrated with reference to FIG. 11.

The composite video signal CVS recorded on a video tape is reproduced in step 120, extracting caption data by the caption data processor 51 from the composite video signal CVS 121, and separating the caption signal from the composite video signal is carried out.

Next, a determination is made as to whether the microcomputer 58 is applying a select signal for displaying the caption and video signal on the same screen or a select signal for displaying the caption and video signal on separate screens step 122.

That is, a display determination step is carried out as to whether the video signal and caption are to be displayed on the same screen.

If the determination is to display the caption and the video signal on the same screen, the composite video signal CVS and the caption data from the caption data processor 51 converted into an image signal is mixed in step 123 by the mixer 53. In other words, if the determination result is to display the video signal and caption on the same screen, a mixing step for mixing the caption image signal and the composite video signal is performed.

After the mixing step, the mixed data is outputted to the monitor 54 and the video signal and the caption is displayed on the same screen in step 124. That is, a mixed display step for displaying the caption image signal and the video signal mixed at the mixing step is displayed on the same screen is carried out.

Alternatively, if the determination is to display the caption and the video signal on separate screens, caption data is converted by the LCD driving circuit 55 into LCD driving data. That is, if the video signal and the caption is to be displayed on separate screens, a separate processing step for processing caption data into display data separate from the video signal is carried out.

After the separate processing step, the composite video signal CVS is outputted to the monitor 54 through the mixer 53 and displayed by the monitor 54, and the LCD driving data is sent to the LCD 57 and displayed on the LCD 57. In other words, after the separate processing step, a separate display step for displaying the processed caption and the video signal on separate screens is carried out.

In addition, in an embodiment as shown in FIG. 8, if caption data is transmitted and received by wireless means, caption processing is carried out as shown in the operational flowchart of FIG. 12.

Accordingly, after performing the separate processing step 125 where caption data is processed into LCD driving data by the LCD driving circuit 55, additional steps 127 of wireless transmission where the analog LCD driving data, or the analog data for the display, is converted to digital data by the data transmitter 56, and wireless reception step 128 for receiving with a wireless receiver the digital data sent by wireless transmission, and converting it into analog LCD driving data or analog display data, are included.

By displaying the caption on a display separate from the monitor screen used to display the video signal, the present invention as described above can prevent the video signal from being covered by the caption of the case when a video signal and caption are displayed on the same screen, allowing efficient language practicing.

In addition, while preferred embodiments of this invention have been illustrated and described hereinabove, many possible modifications and variations thereof will become apparent to those persons skilled in the art without departure from the scope and spirit of this invention, as defined in the appended claims.

What is claimed is:

1. A caption processing device for a display unit with a separate display, the display unit extracts caption data from a video signal and displays the caption, said device comprising:

a separate display for continuously displaying the caption data separated from the video signal;

a control part for generating a control signal to continuously synchronize display of the caption data and video data with extraction of the caption data;

a display driving part for receiving the continuously synchronized caption data, processing the caption data according to the control signal outputted from the control part and continuously updating and applying the processed data to said display; and a switching unit being controlled by the control part for selectively applying the extracted caption data either to the display driving part or to a mixer for mixing the video signal and the continuously synchronized caption data and applying the mixed signal to a monitor.

2. A caption processing device according to claim 1, wherein said separate display employs a LCD attached to the front panel of a VCR.

3. A caption processing device according to claim 1, wherein said separate display employs a LCD attached to a remote controller.

4. A caption processing device according to claim 1, wherein said separate display employs a LCD attached to a specified position exterior to said monitor separate from the video display of said monitor.

5. A caption processing device according to claim 1, wherein said separate display employs a LCD placed separately from said monitor and a caption VCR.

6. A captation processing device according to claim 1, wherein said separate display employs a LCD placed at a specific position exterior to a caption VCR.

7. A caption processing method for a display unit with a display screen and a separate display comprising:

a signal separation step for separating continuously synchronized caption data from a video signal;

a display determining step for determining whether the separated caption data is to be displayed either on the same display screen of the display unit or on the separate display;

a processing step for continuously processing and synchronizing the caption data into data to be used for display either on the same display screen of the display unit or on the separate display; and a separate display step for continuously displaying the processed caption data on a display unit while preventing the caption data from overlapping the video signal.

8. The method according to claim 7, further comprising a mixing step for mixing the caption data and the video signal when the image signal and the caption data are displayed on the same screen in response to the result of the display determining step, and a mixing display step for displaying the continuously synchronized caption data and the video signal on the same screen.

9. A caption processing device for a display unit with a separate display, comprising:

a caption data processor for extracting continuously synchronized caption data from a video signal and continuously outputting said caption data;

a separate display for displaying the continuously synchronized caption data separated from the video signal;

a control part for generating a control signal to control display of the caption data;

a display driving part for receiving the continuously synchronized caption data, processing the caption data according to the control signal output from the control part and continuously synchronizing and applying the processed data to said separate display; and a switching unit being controlled by the control part for selectively applying the extracted caption data either to the display driving part or to a mixer for mixing the video signal and the continuously synchronized caption data and applying the mixed signal to said monitor.

* * * * *